(12) United States Patent
Gao et al.

(10) Patent No.: US 12,170,598 B2
(45) Date of Patent: Dec. 17, 2024

(54) ARTIFICIAL INTELLIGENCE (AI) RELATED SIGNALLING FLOW OVER BACKHAUL INTERFACES

(71) Applicant: ZTE Corporation, Guangdong (CN)

(72) Inventors: Yin Gao, Guangdong (CN); Jiajun Chen, Guangdong (CN); Zhuang Liu, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/815,697

(22) Filed: Jul. 28, 2022

(65) Prior Publication Data
US 2022/0368605 A1    Nov. 17, 2022

Related U.S. Application Data

(63) Continuation of application No. PCT/CN2020/120542, filed on Oct. 13, 2020.

(51) Int. Cl.
*H04L 41/16* (2022.01)
*H04L 41/14* (2022.01)
*H04W 24/02* (2009.01)

(52) U.S. Cl.
CPC ............ *H04L 41/16* (2013.01); *H04L 41/145* (2013.01); *H04W 24/02* (2013.01)

(58) Field of Classification Search
CPC ....... H04L 41/16; H04L 41/145; H04W 24/02
See application file for complete search history.

(56) References Cited

U.S. PATENT DOCUMENTS

| | | | |
|---|---|---|---|
| 2016/0366009 A1* | 12/2016 | Bedekar | H04W 24/02 |
| 2018/0295196 A1* | 10/2018 | Jeong | H04L 67/51 |
| 2020/0195495 A1 | 6/2020 | Parker et al. | |
| 2020/0195506 A1* | 6/2020 | Peng | H04W 24/02 |
| 2021/0329466 A1* | 10/2021 | Khasnabish | H04W 24/02 |
| 2021/0385682 A1* | 12/2021 | Bedekar | H04W 28/0215 |
| 2022/0052915 A1* | 2/2022 | Estevez | H04W 24/02 |
| 2022/0052923 A1 | 2/2022 | Meng et al. | |
| 2022/0197953 A1 | 6/2022 | Yuan et al. | |

OTHER PUBLICATIONS

ZTE, "Artificial Intelligence based Energy Saving," 3GPP TSG RAN Wg #88-e, e-Meeting, RP-200781, 5 pages, Jun. 29-Jul. 3, 2020.
International Search Report and Written Opinion for International Application No. PCT/CN2020/120542, mailed on Jun. 24, 2021 (6 pages).

* cited by examiner

*Primary Examiner* — Nam T Tran
(74) *Attorney, Agent, or Firm* — Perkins Coie LLP

(57) ABSTRACT

This patent document describes, among other things, techniques, and apparatuses for providing artificial intelligence to improve wireless network efficiency and performance. In one aspect, a method of wireless communication is disclosed. The method includes transmitting, from a first network node to a second network node, a first network control message requesting to start an artificial intelligence process comprising an artificial intelligence objective or an identification code. The method further includes receiving, at the first network node from the second network node, a first reply message indicating at least one of the artificial intelligence process has started, the identifier, a request indicator for a model for the artificial intelligence process, or a failure message.

9 Claims, 8 Drawing Sheets

400

---

410 — Transmitting, from a first network node to a second network node, a first network control message requesting to start an artificial intelligence process comprising an artificial intelligence objective or an identification code

420 — Receiving, at the first network node from the second network node, a first reply message indicating at least one of the artificial intelligence process has started, the identifier, a request indicator for a model for the artificial intelligence process, or a failure message

Transmitting, from a first network node to a second network node, a network control message comprising an artificial intelligence model type or an artificial intelligence model data — 510

Receiving, at the first network node from the second network node, a reply message indicating an acknowledgement of the artificial intelligence model type, an identifier, or a failure message — 520

Transmitting, from a first network node to a second network node, a request message for artificial intelligence measurements comprising an artificial intelligence measurement objective, an artificial intelligence report configuration, or an artificial intelligence report granularity — 610

Receiving, at the first network node from the second network node, an artificial intelligence measurement reply message indicating the artificial intelligence measurement has started, or a failure message — 620

FIG. 6

ARTIFICIAL INTELLIGENCE (AI) RELATED SIGNALLING FLOW OVER BACKHAUL INTERFACES

CROSS-REFERENCE TO RELATED APPLICATION

This application claims priority to International Application No. PCT/CN2020/120542, filed on Oct. 13, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques, and apparatuses for providing artificial intelligence to improve wireless network efficiency and performance.

In one aspect, a method of wireless communication is disclosed. The method includes transmitting, from a first network node to a second network node, a first network control message requesting to start an artificial intelligence process comprising an artificial intelligence objective or an identification code. The method further includes receiving, at the first network node from the second network node, a first reply message indicating at least one of the artificial intelligence process has started, the identifier, a request indicator for a model for the artificial intelligence process, or a failure message.

In another aspect, another method for wireless communications is disclosed. The method includes transmitting, from a first network node to a second network node, a network control message comprising an artificial intelligence model type or an artificial intelligence model data. The method further includes receiving, at the first network node from the second network node, a reply message indicating an acknowledgement of the artificial intelligence model type, an identifier, or a failure message.

In another aspect, another method for wireless communications is disclosed. The method includes transmitting, from a first network node to a second network node, a request message for artificial intelligence measurements comprising an artificial intelligence measurement objective, an artificial intelligence report configuration, or an artificial intelligence report granularity. The method further includes receiving, at the first network node from the second network node, an artificial intelligence measurement reply message indicating the artificial intelligence measurement has started, or a failure message.

In another aspect, an apparatus is disclosed. The apparatus includes at least one processor; and at least one memory including executable instructions that when executed by the at least one processor performs operations including the following. Transmitting, from a first network node to a second network node, a request message for artificial intelligence measurements comprising an artificial intelligence measurement objective, an artificial intelligence report configuration, or an artificial intelligence report granularity. Receiving, at the first network node from the second network node, an artificial intelligence measurement reply message indicating the artificial intelligence measurement has started, or a failure message.

These, and other, aspects are described in the present document.

BRIEF DESCRIPTION OF DRAWINGS

FIG. 4 shows an example of a method for wireless communication.

FIG. 5 shows another example of a method for wireless communication.

FIG. 6 shows another example of a method for wireless communication.

DETAILED DESCRIPTION

Certain features are described using the example of Fifth Generation (5G) wireless protocol. However, applicability of the disclosed techniques is not limited to only 5G wireless systems.

5G systems (5GS) support self-organizing networks (SON) that were introduced in LTE to support deployment of the system and performance optimization. The first SON features included physical cell identity (PCI) allocation and automatic neighbor relations (ANR). Success of these two features encouraged further study on the topic and enabled three additional SON features: mobility robustness optimization (MRO), mobility load balancing (MLB), and random-access channel (RACH) optimization. MRO and MLB are enablers of long-term evolution (LTE) and were further enhanced to match increasing LTE complexity. Besides ANR, MRO, MLB and RACH optimization, other features enabling particular aspects of network self-optimization were discussed and enabled in separate SIs/WIs: minimization of drive tests (MDT), energy saving (ES), interference cancellation (ICIC, eICIC), etc. These SON features are performed based on the statistic of massive data from the network and UE, which originate data usage in the radio access network (RAN).

Further enhancements to data collection have been approved in some standards. A difference between the current network optimization with SON/MDT and artificial intelligence (AI)-based networks is that AI-based networks evolve from a reactive paradigm to a proactive paradigm.

Disclosed herein are techniques for providing AI improvements to system efficiency using AI models, functions, and management.

System changes that AI capability adds to network capability include:
- Full intelligence of the current network status leading to more valuable information being collected from the various network elements including user equipment (UE), RAN nodes, or the core network (CN).
- Capability of predicting network load, prediction of UE behavior, prediction of user experience;
- Capability of dynamically associating the network response with the network key performance indicators (KPIs) using a closed loop method.

Figure 1:
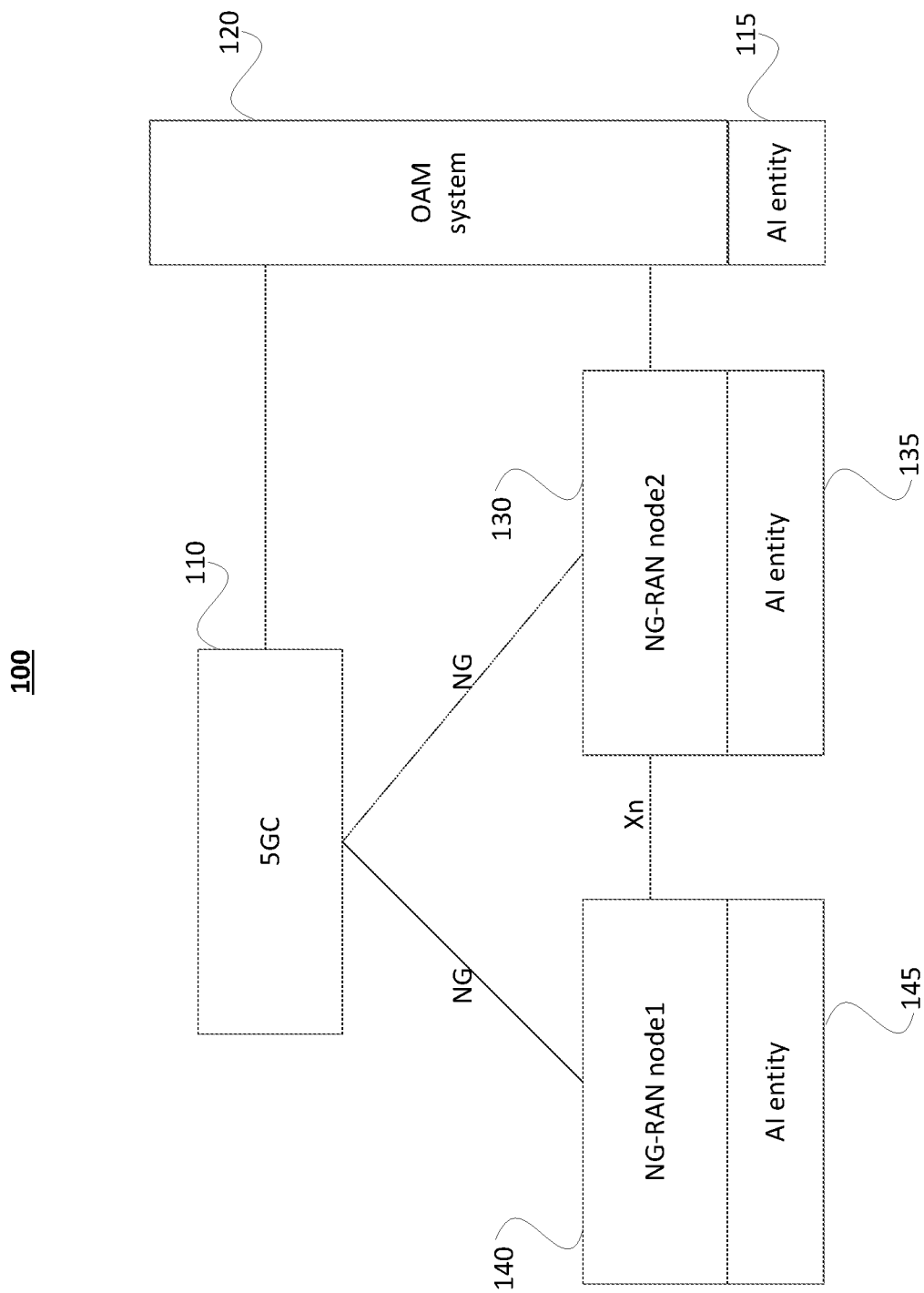
FIG. 1 shows an example of an AI-based RAN architecture.

An example of an AI-based RAN architecture 100 is shown in FIG. 1. The example architecture includes the 5G core network (5GC) 110, next-generation radio access networks (NG-RANs) 130 and 140, each with an AI entity or capability 135 and 145, respectively. The example architecture includes operations administration and maintenance (OAM) system 120 which also has an AI entity 115. This architecture takes into account the current NG-RAN architecture and interfaces to enable AI support for 5G deployments. Shown in FIG. 1 is a non-split RAN architecture. Data collection and action can be located in the NG-RAN node for the use cases for RAN optimization. Model training and model inference can be performed at a single node (e.g., OAM system or the NG-RAN node) or model training can be performed at the OAM system, and model inference performed at the NG-RAN node.

The AI entities 125, 135, and 145 in FIG. 1 include at least one AI management element described below with respect to FIG. 2.

Figure 2:
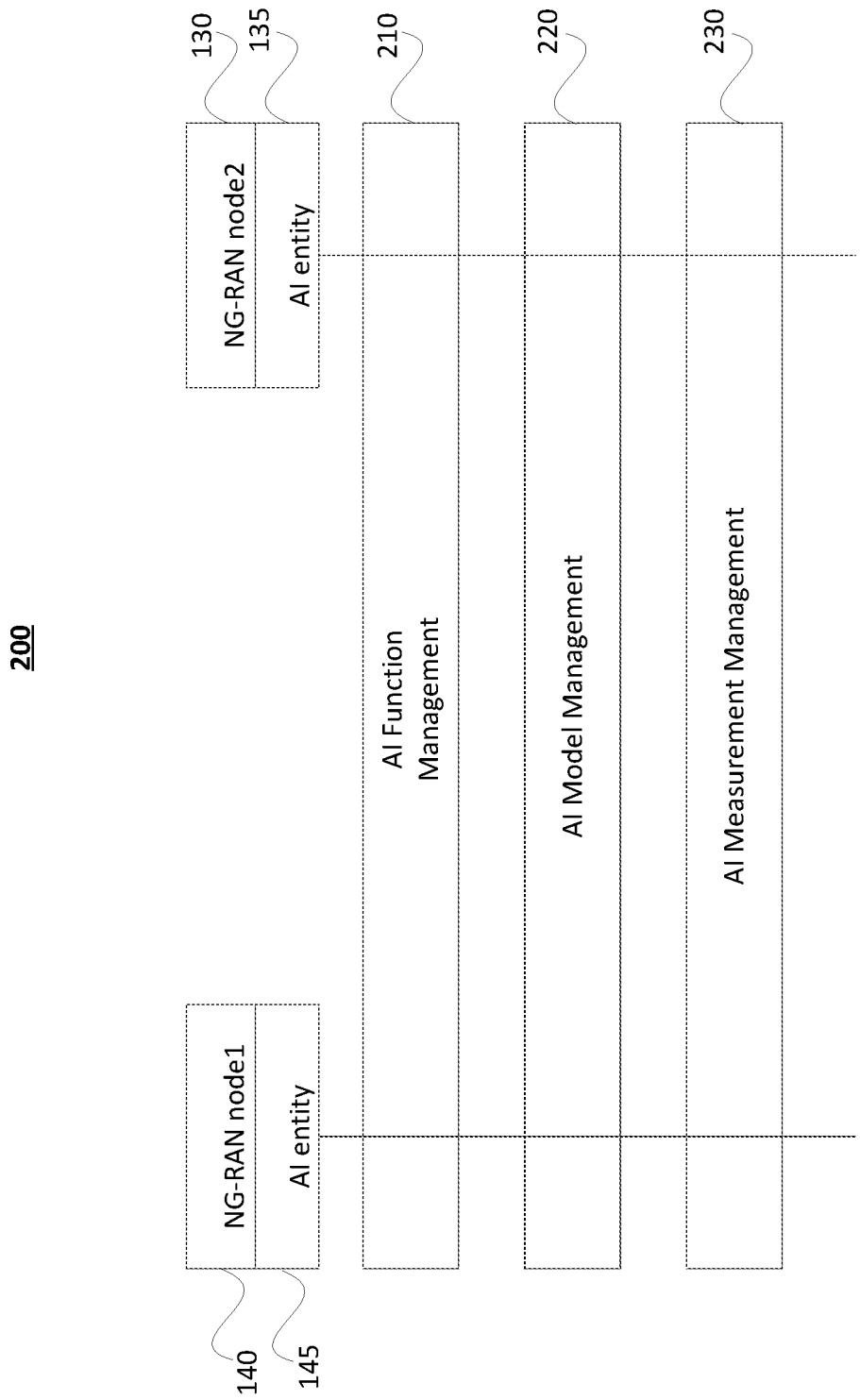
FIG. 2 shows AI management elements associated with two base stations.

FIG. 2 shows NG-RAN node1 140 and associated AI entity 145 interfaced via AI management elements to NG-RAN node1 130 and associated AI entity 135. The AI management elements include one or more of: AI function management 210, AI model management 220, and/or AI measurement management 230. These management elements are further described below.

No matter what AI management element(s) is included with the AI entity 125/135/145, the backhaul interface between NG-RAN nodes should be enhanced to enable AI functions. The Xn interface provides a control plane interface between radio access nodes (e.g., NG-RANs). In the disclosed subject matter, the Xn interface is enhanced to include the following functions in order to support AI:

The Xn control plane (Xn-C) interface supports the following functions:
- AI function management 210: This function enables the AI function(s) between the NG-RAN nodes that are supported by both nodes to start and/or stop.
- AI model management 220: This function enables one NG-RAN node to retrieve the machine learning (ML) model from a peer NG-RAN node. With this function, the updated ML model can be synchronized between the NG-RAN nodes.
- AI measurement management 230: This function allows AI measurement report between NG-RAN nodes.

Figure 3:
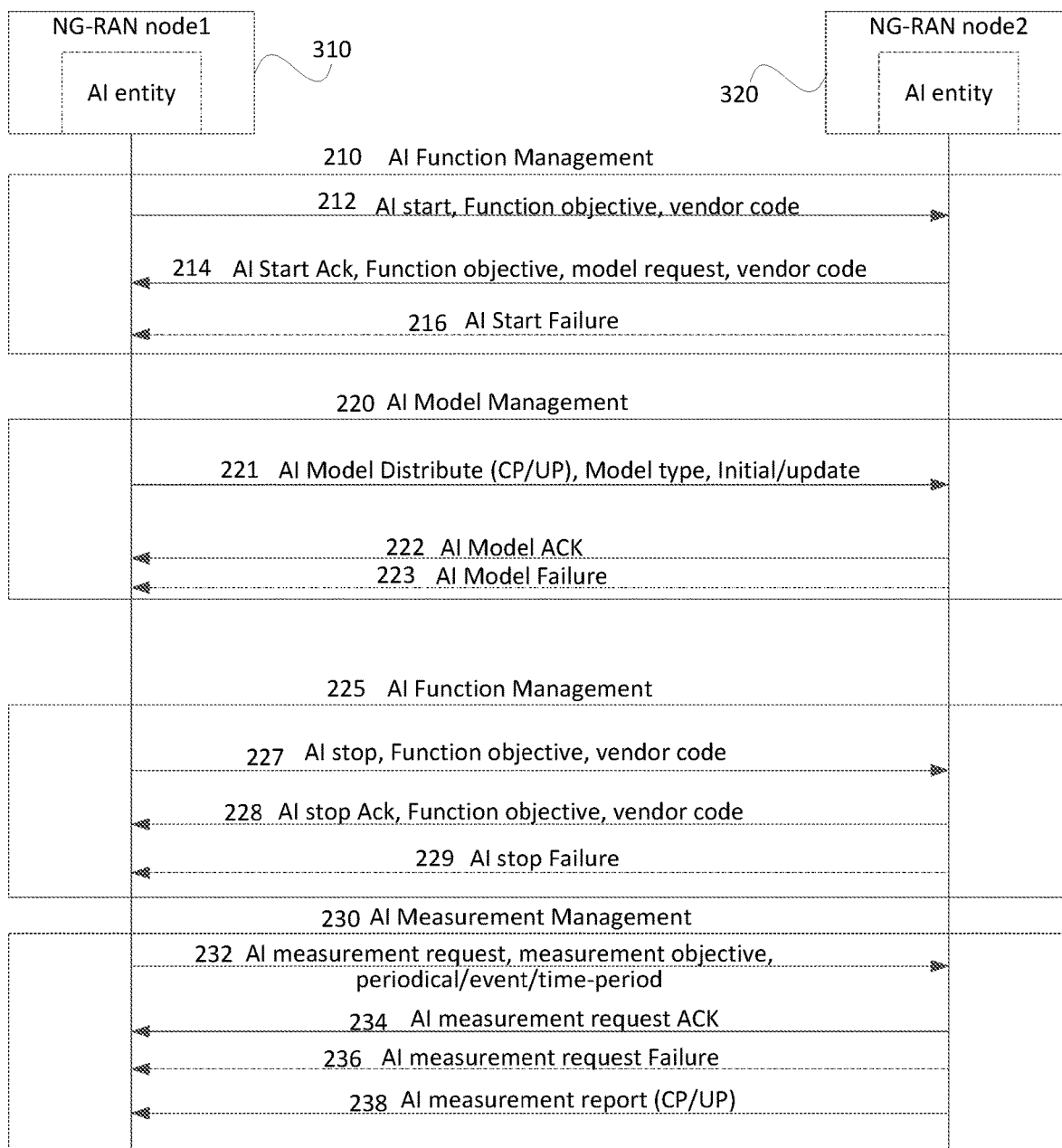
FIG. 3 shows AI related control plane signaling between two base stations.

FIG. 3 depicts AI related Xn application protocol (XnAP) signaling that can be transferred over a specific stream control transmission protocol (SCTP) association between NG-RAN node1 and NG-RAN node2. This SCTP association is established for AI signaling purposes.

In FIG. 3, NG-RAN node1 310 interfaces with NG-RAN node2 315 via AI management elements including one or more of: AI function management 210, AI model management 220, and/or AI measurement management 230.

A signaling flow method for AI function management 210 includes the following elements.

At 212, NG-RAN node1 310 sends an AI start message to NG-RAN node2 315. The start message includes at least one of the following: AI function objectives to be started, and/or a vendor code. AI function objectives are the AI functions supported by the NG-RAN node such as AI-based ES, AI-based UE trajectory prediction, AI-based load prediction, AI-based mobility optimization, and so on. The vendor code can be a value used to identify a manufacturer or vendor. For example, the value 1 for vendor-A, or value 2 for vendor-B.

At 214, the NG-RAN node2 315 replies with an acknowledgment message (e.g., AI START ACK message). The acknowledgment message includes at least one of: an AI function objective started successfully indication, the vendor code, and/or a model request. If the NG-RAN node2 wants to retrieve the machine learning (ML)/AI model information from NG-RAN node1 310, the acknowledgment message will include model request information related to the requested AI function objective.

At 216, if the AI start fails, the NG-RAN node2 315 replies with a failure message (e.g., AI START FAILURE message) with an indication of the cause for the failure.

A signaling flow method for AI function management 225 include the following elements.

After the AI function has been initialized, the AI stop procedure can be used to stop one or more AI functions between the NG-RAN node1 310 and NG-RAN node2 315.

At 227, the NG-RAN node1 310 sends an AI stop message to NG-RAN node2 315. The message includes at least one of the following: the AI function objectives to be stopped and/or the vendor code. The AI function objectives are the AI functions supported by the NG-RAN node such as AI-based ES, AI-based UE Trajectory prediction, AI-based load prediction, AI-based mobility optimization, and so on. The vendor code can be a value used to identify a manufacturer or vendor. For example, the value 1 for vendor-A, or value 2 for vendor-B.

At 228, the NG-RAN node2315 replies with an acknowledgment message (e.g., AI STOP ACK message). The message includes at least one of: the AI function objectives stopped successfully, and/or a vendor code.

At 229, if the AI stop fails, the NG-RAN node2 315 replies with a failure message (e.g., AI STOP FAILURE message) with an indication of the cause for the failure.

A signaling flow method for AI model management 220 include the following elements.

At 221, the NG-RAN node1 310 sends a model distribution message (e.g., AI MODEL DISTRIBUTION message) to the NG-RAN node2 315. The message includes at least one of: a model type, an event type, and/or model data. The model type corresponds to each requested AI function objective, where the AI/ML models include supervised learning, unsupervised learning, reinforcement learning, deep neural network. The event type indicates whether the model management message is related to model initialization or model update. The model data can be transferred via either the control plane via the AI MODEL DISTRIBUTION message, or via the user plane.

At 222, the NG-RAN node2 315 replies with an acknowledgement message (e.g., AI MODEL ACK message). The message may include the vendor code.

At 223, if the AI model fails, the NG-RAN node2 315 replies with a failure message (e.g., AI MODEL FAILURE message) with an indication of the cause for the failure.

A signaling flow method for AI measurement management 230 includes the following elements.

At 232, the NG-RAN node1 310 sends a measurement request message (e.g., AI MEASUREMENT REQUEST message) to NG-RAN node2 315. The message includes at least one of: a measurement objective, a report configuration, a report granularity. The measurement objective indicates the measurement object the peer node is requested to report. The report configuration indicates the configuration for a periodic report, a time-period report, and/or an event trigger report. The report granularity includes but is not limited to the UE granularity, cell granularity, node granularity, and/or slice granularity.

At 234, the NG-RAN node2 315 replies with an acknowledgement message (e.g., AI MEASUREMENT REQUEST ACK message). The message may indicate that the requested measurement has been successfully initiated.

At 236, if the AI measurement request fails, the NG-RAN node2 315 replies with a failure message (e.g., AI MEASUREMENT REQUEST FAILURE message) with an indication of the cause for the failure.

At 236, the NG-RAN node2 315 starts to report measurements in a report message (e.g., AI MEASUREMENT REPORT message). The message includes at least one of: a measurements result, a report granularity. The details measurements data can be transferred either in this control plane message, or via user plane.

Furthermore, the signaling method described above can be used between a 5G core network (5GC) node and an NG-RAN node.

Furthermore, a measurement ID can be used in the above signaling method to identify a specific measurement.

Furthermore, a transaction ID can be used in the above signaling method to identify a procedure among ongoing parallel procedures of the same type initiated by the same protocol peer. Messages belonging to the same procedure may use the same transaction ID where the transaction ID is determined by the initiating peer of a procedure.

FIG. 4 shows an example of a method 400 for wireless communication. At 410, in some embodiments of the disclosed technology, the method includes transmitting, from a first network node to a second network node, a first network control message requesting to start an artificial intelligence method comprising an artificial intelligence objective or an identification code. At 420, the method includes receiving, at the first network node from the second network node, a first reply message indicating at least one of the artificial intelligence method has started, the identifier, a request indicator for a model for the artificial intelligence method, or a failure message.

FIG. 5 shows another example of a method 500 for wireless communication. At 510, in some embodiments of the disclosed technology, the method includes transmitting, from a first network node to a second network node, a network control message comprising an artificial intelligence model type or an artificial intelligence model data. At 520, the method further includes receiving, at the first network node from the second network node, a reply message indicating an acknowledgement of the artificial intelligence model type, an identifier, or a failure message.

FIG. 6 shows another example of a method 600 for wireless communication. At 610, in some embodiments of the disclosed technology, the method includes transmitting, from a first network node to a second network node, a request message for artificial intelligence measurements comprising an artificial intelligence measurement objective, an artificial intelligence report configuration, or an artificial intelligence report granularity. At 620, the method further includes receiving, at the first network node from the second network node, an artificial intelligence measurement reply message indicating the artificial intelligence measurement has started, or a failure message.

Figure 7:
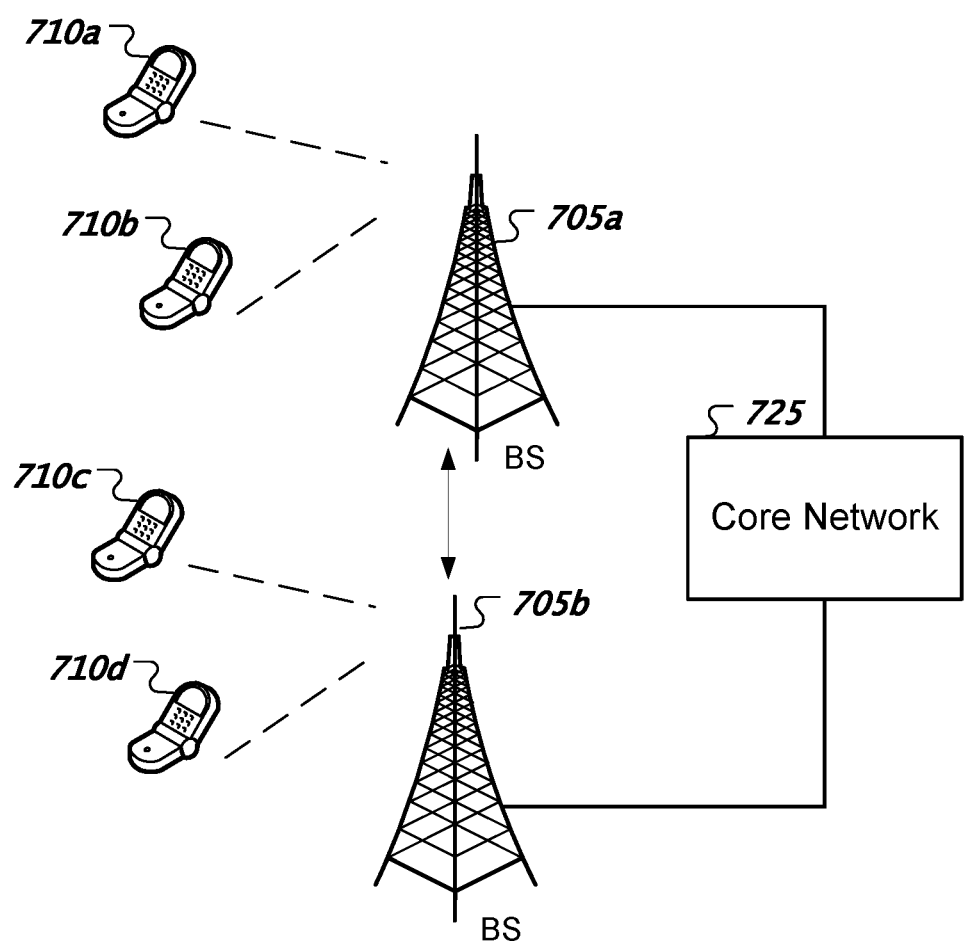
FIG. 7 shows a wireless communication system.

FIG. 7 shows an example of a wireless communication system 700 where techniques in accordance with one or more embodiments of the present technology can be applied. A wireless communication system 700 can include one or more base stations (BSs) 705a, 705b, one or more wireless devices 710a, 710b, 710c, 710d, and a core network 725. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors. The base station 705a, 705b may communicate directly with one another wirelessly or via a wired interface including a direct wired interface, a wired network, or the Internet.

The core network 725 can communicate with one or more base stations 705a, 705b. The core network 725 provides connectivity with other wireless communication systems and wired communication systems. The core network may include one or more service subscription databases to store information related to the subscribed wireless devices 710a, 710b, 710c, and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The wireless devices 710a, 710b, 710c, and 710d can support multiple different radio access technologies. The techniques and embodiments described in the present document may be implemented by the base stations described in the present document or by wireless devices.

Figure 8:
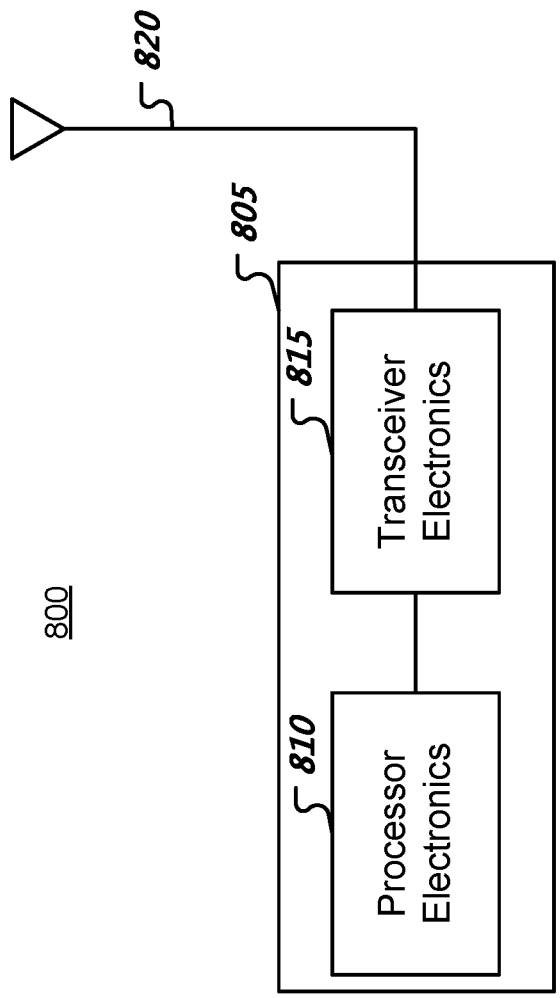
FIG. 8 shows a block diagram of a portion of a radio system.

FIG. 8 is a block diagram representation of a portion of a radio station in accordance with one or more embodiments of the present technology can be applied. A radio 805 such as a base station or a wireless device (or UE) can include electronics 810 such as a microprocessor that implements one or more of the wireless techniques presented in this document. The radio 805 can include transceiver electronics 815 to send and/or receive wireless signals over one or more communication interfaces such as antenna 820. The radio 805 can include other communication interfaces for transmitting and receiving data. Radio 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio 805. In some embodiments, the radio 805 may be configured to perform the methods described in this document.

The technical solutions described by the following clauses may be preferably implemented by some embodiments.

Clause 1. A method of wireless communication, comprising: transmitting, from a first network node to a second network node, a first network control message requesting to start an artificial intelligence process comprising an artificial intelligence objective or an identification code; and receiving, at the first network node from the second network node, a first reply message indicating at least one of the artificial intelligence process has started, the identifier, a request indicator for a model for the artificial intelligence process, or a failure message.

Clause 2. The method of wireless communication of clause 1, further comprising: transmitting, from the first network node to the second network node, a second network control message requesting to stop the artificial intelligence process, wherein the second network message indicates at least one of the artificial intelligence objective to be stopped or the identification code; and receiving, at the first network node from the second network node, a second reply message indicating at least one of an artificial intelligence stopped message, the identifier, or another failure message.

Clause 3. The method of wireless communication of clauses 1 or 2, wherein the artificial intelligence process comprises at least one of: an artificial intelligence expert system; an artificial intelligence based user equipment movement prediction; an artificial intelligence based network load prediction; or an artificial intelligence based mobility optimization.

Clause 4. A method of wireless communication, comprising: transmitting, from a first network node to a second network node, a network control message comprising at least one of an artificial intelligence model type, or an artificial intelligence model data; and receiving, at the first network node from the second network node, a reply message indicating at least one of an acknowledgement of the artificial intelligence model type, an identifier, or a failure message.

Clause 5. The method of wireless communication of clause 4, wherein the artificial intelligence mode comprises at least one of: a supervised learning model; an unsupervised learning model; a reinforcement leaning model; or a deep neural network model.

Clause 6. A method of wireless communication, comprising: transmitting, from a first network node to a second network node, a request message for artificial intelligence measurements comprising an artificial intelligence measurement objective, an artificial intelligence report configuration, or an artificial intelligence report granularity; and receiving, at the first network node from the second network node, an artificial intelligence measurement reply message indicating the artificial intelligence measurement has started, or a failure message.

Clause 7. The method of wireless communication of clause 6, wherein the artificial intelligence measurement objective is a measurement object a peer node is requested to report.

Clause 8. The method of wireless communication of clause 6, wherein the artificial intelligence report configuration indicates a periodic report or an event triggered report or time period report.

Clause 9. The method of wireless communication of clause 6, wherein the artificial intelligence report granularity indicates a user equipment granularity, a cell granularity, a node granularity, or a slice granularity.

Clause 10. The method of wireless communication of clause 6, further comprising: receiving, at the first network node from the second network node, the artificial intelligence measurements.

Clause 11. The method of wireless communication of any of clauses 6 to 10, wherein a measurement identifier identifies the artificial intelligence measurements.

Clause 12. The method of wireless communication of any of clauses 1 to 11, wherein a transaction identifier identifies ongoing parallel procedures of the same type initiated by a same protocol peer.

Clause 13. The method of wireless communication of any of clauses 1 to 12, wherein the first network node is a next-generation radio access network node (NG-RAN node) and the second network node is NG-RAN node, or the first network node is a NG-RAN node and the second network node is a core network node.

In the technical solutions described herein in clause format, the network node may be a network device or a network-side equipment such as a base station. FIG. 8 shows an example hardware platform for implementing the network node or a wireless node.

It will be appreciated that the present document discloses techniques that can be embodied in various embodiments to establish and manage AI functions in a cellular network. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

What is claimed is:

1. A method of wireless communication, comprising:
transmitting, from a first network node to a second network node, a first network control message requesting to start an artificial intelligence process, wherein the first network control message comprises an artificial intelligence objective and an identification code, wherein an artificial intelligence measurement management allows an artificial intelligence measurement report between the first network node and the second network node;
receiving, at the first network node from the second network node, a first reply message indicating the artificial intelligence process has started and the identification code, wherein the artificial intelligence process comprises an artificial intelligence based network load prediction and/or an artificial intelligence based mobility optimization;
transmitting, from the first network node to the second network node, a second network control message requesting to stop the artificial intelligence process, wherein the second network control message indicates the artificial intelligence objective to be stopped and the identification code; and
receiving, at the first network node from the second network node, a second reply message indicating that the artificial intelligence objective stopped successfully and the identification code.

2. The method of wireless communication of claim 1, wherein the artificial intelligence process comprises an artificial intelligence expert system.

3. The method of wireless communication of claim 1, further comprising:
receiving, at the first network node from the second network node, a failure message with an indication of a cause for a failure in response to a failure to start the artificial intelligence process.

4. An apparatus, comprising:
at least one processor; and
at least one memory including executable instructions that when executed by the at least one processor cause the apparatus to:
transmit, from a first network node to a second network node, a first network control message requesting to start an artificial intelligence process comprising an artificial intelligence objective and an identification code, wherein an artificial intelligence measurement management allows an artificial intelligence measurement report between the first network node and the second network node;
receive, at the first network node from the second network node, a first reply message indicating the artificial intelligence process has started and the identification code, wherein the artificial intelligence process comprises an artificial intelligence based network load prediction and/or an artificial intelligence based mobility optimization;
transmit, from the first network node to the second network node, a second network control message requesting to stop the artificial intelligence process, wherein the second network control message indicates the artificial intelligence objective to be stopped and the identification code; and
receive, at the first network node from the second network node, a second reply message indicating that the artificial intelligence objective stopped successfully and the identification code.

5. The apparatus of claim 4, wherein the artificial intelligence process comprises an artificial intelligence expert system.

6. The apparatus of claim 4, wherein the at least one processor is further configured to:
receive, at the first network node from the second network node, a failure message with an indication of a cause for a failure in response to a failure to start the artificial intelligence process.

7. A non-transitory computer readable medium having code stored thereon, the code, when executed by a processor, causing the processor to implement a method, comprising:
transmitting, from a first network node to a second network node, a first network control message requesting to start an artificial intelligence process comprising an artificial intelligence objective and an identification code, wherein an artificial intelligence measurement management allows an artificial intelligence measurement report between the first network node and the second network node;
receiving, at the first network node from the second network node, a first reply message indicating the artificial intelligence process has started and the identification code, wherein the artificial intelligence process comprises an artificial intelligence based network load prediction and/or an artificial intelligence based mobility optimization;
transmitting, from the first network node to the second network node, a second network control message requesting to stop the artificial intelligence process, wherein the second network control message indicates the artificial intelligence objective to be stopped and the identification code; and
receiving, at the first network node from the second network node, a second reply message indicating that the artificial intelligence objective stopped successfully and the identification code.

8. The non-transitory computer readable medium of claim 7, wherein the artificial intelligence process comprises an artificial intelligence expert system.

9. The non-transitory computer readable medium of claim 7, wherein the method further comprises:
   receiving, at the first network node from the second network node, a failure message with an indication of a cause for a failure in response to a failure to start the artificial intelligence process.

\* \* \* \* \*